(12) United States Patent
Takeuchi

(10) Patent No.: US 7,839,731 B2
(45) Date of Patent: Nov. 23, 2010

(54) OPTICAL SYSTEM FOR OPTICAL DISC

(75) Inventor: Shuichi Takeuchi, Saitama-ken (JP)

(73) Assignee: Hoya Corporation, Tokyo (JP)

( * ) Notice: Subject to any disclaimer, the term of this patent is extended or adjusted under 35 U.S.C. 154(b) by 962 days.

(21) Appl. No.: 11/014,034

(22) Filed: Dec. 17, 2004

(65) Prior Publication Data

US 2005/0135208 A1 Jun. 23, 2005

(30) Foreign Application Priority Data

Dec. 18, 2003 (JP) ............................. 2003-420819

(51) Int. Cl.
G11B 7/00 (2006.01)
(52) U.S. Cl. ............... 369/44.27; 369/53.19; 369/44.32
(58) Field of Classification Search ........................ None
See application file for complete search history.

(56) References Cited

U.S. PATENT DOCUMENTS

| | | | |
|---|---|---|---|
| 5,002,374 | A | 3/1991 | Ishibai et al. |
| 5,754,504 | A | 5/1998 | Yamazaki et al. |
| 6,304,526 | B1 * | 10/2001 | Nagashima et al. ...... 369/44.23 |
| 6,477,129 | B2 * | 11/2002 | Maruyama et al. ....... 369/44.23 |
| 6,807,018 | B2 | 10/2004 | Maruyama et al. |
| 6,829,105 | B2 | 12/2004 | Kubo |
| 2001/0015939 | A1 | 8/2001 | Kubo |
| 2001/0043549 | A1 | 11/2001 | Maruyama et al. |
| 2003/0189772 | A1 * | 10/2003 | Maruyama et al. .......... 359/823 |

FOREIGN PATENT DOCUMENTS

| | | |
|---|---|---|
| JP | 64-25113 | 1/1989 |
| JP | 1-196740 | 8/1989 |
| JP | 2-223906 | 9/1990 |
| JP | 8-62496 | 9/1996 |
| JP | 8-334686 | 12/1996 |
| JP | 10-228653 | 8/1998 |
| JP | 11-023960 | 1/1999 |
| JP | 11-259891 | 9/1999 |
| JP | 2001-297476 | 10/2001 |
| JP | 2002-251767 | 9/2002 |
| JP | 2002251767 A * | 9/2002 |
| JP | 2002-298352 | 10/2002 |
| JP | 2003-295051 | 10/2003 |

OTHER PUBLICATIONS

English translation of JP 2002251767 A.*
English Language Abstract of JP 8-62496.
English Language Abstract of JP 8-334686.
English Language Abstract of JP 64-25113.
English language translation of JP 1-196740.

* cited by examiner

*Primary Examiner*—Jorge L Ortiz Criado
(74) *Attorney, Agent, or Firm*—Greenblum & Bernstein P.L.C.

(57) ABSTRACT

There is provided an optical system for an optical disc which requires a numerical aperture larger than or equal to 0.60. The optical system is provided with a light source, an objective lens, and a driving system that controls a position and an attitude of the objective lens. The driving system operates to move the objective lens in a direction perpendicular to a central axis of the objective lens for a tracking operation, and to change the attitude of the objective lens during the tracking operation so that the central axis on a light source side tilts toward the light source.

18 Claims, 6 Drawing Sheets

OPTICAL SYSTEM FOR OPTICAL DISC

BACKGROUND OF THE INVENTION

The present invention relates to an optical system used to record data to and/or reproduce data from one or more types of optical discs having different thicknesses of cover layers and/or different data recording densities.

There are various types of optical discs such as a CD (compact disc) and a DVD (digital versatile disc). The DVD has the cover layer thinner than that of the CD, and has a data recording density higher than that of the CD. For supporting both of the CD and DVD, the optical system for optical discs (i.e. an optical pick-up) is required to correct a spherical aberration which changes depending on the thickness of the cover layer of an optical disc being used and to change NA (numerical aperture) of a light beam so as to attain an effective beam diameter suitable for recording/reproducing operation of the optical disc being used.

In general, the optical system for optical discs has a light source for emitting the light beam, a coupling lens, and an objective lens. The coupling lens has the function of collimating the light beam emitted by the light source, or changing the degree of divergence of the light beam emitted by the light source. That is, the coupling lens is employed in the optical system to suppress aberrations or to enhance the efficiency of use of light.

There is a demand for decreasing the number of optical components in the optical system to decrease the cost of an optical pick-up and to further downsize the optical pick-up. Each of Japanese Patent Provisional Publications No. HEI 8-62496, HEI 8-334686, SHO 64-25113 and HEI 2-223906 discloses an optical pick-up which does not require the coupling lens. The optical system disclosed in each of the publications is configured to form a relatively large beam spot suitable for an optical disc having a relatively low recoding density and having a relatively thick cover layer (e.g. CD or CD-R). Since the optical system has a relatively small NA, the relatively large beam spot is attained.

It is noted that aberrations are caused in the optical system disclosed in each of the publications if a position of the objective lens is changed with respect to a position of the light source. More specifically, a spherical aberration is caused when the objective lens is moved in a direction of its central axis (optical axis) for a focusing operation. A coma and astigmatism are caused when the objective lens is moved in a direction perpendicular to the optical axis from a reference axis for a tracking operation because in this case off-axis light is incident on the objective lens.

As used herein, the term reference axis represents an axis including the optical axis of the objective lens and passing through the light source in a condition in which the objective lens is not moved by the tracking operation in the direction perpendicular to the optical axis. Also, the term "reference position" of the objective lens is defined as an initial position of the tracking operation.

It is required that aberrations are sufficiently suppressed for performing the recording/reproducing operation with high accuracy. In particular, aberrations having an asymmetric property such as a coma and astigmatism are main factors that deteriorate quality of a recording (optical) signal and a reproducing (optical) signal. Therefore, it is particularly required that the optical system is configured to sufficiently suppress the aberrations having an asymmetric property.

Hereafter, the term "tracking shift movement" represents movement of the objective lens in the direction (i.e. a radial direction of an optical disc) perpendicular to the optical axis due to the tracking operation, and a term "focusing shift movements" represents movement of the objective lens in the direction of the optical axis due to the focusing operation.

The coma caused in a cover layer of the optical disc when the optical disc tilts relative to the optical axis of the objective lens has such a property that it changes depending on the thickness of the cover layer. For this reason, both surfaces of the objective lens provided in the optical system disclosed in each of the publications are configured to be aspherical surfaces which cancel the coma caused in the cover layer of the optical disc. That is, the objective lens is configured as an aplanatic lens.

By contrast, sufficient correction of another aberration having an asymmetric property, i.e. astigmatism, is very difficult even if the objective lens of which both surfaces are asymmetrical surfaces is employed in the optical system. Therefore, the optical system disclosed in each of the publications can be used only for an optical disc, such as a CD, having relatively large tolerance to aberrations. That is, the optical system is specialized for an optical disc drive used for the optical disc having a relatively large tolerance to aberrations.

In other words, the optical system can not be used for an optical disc (such as a DVD) which has a relatively large recording density and requires a relatively small beam spot diameter.

Recently, optical systems which support both of the CD and DVD (hereafter, referred to as a CD/DVD-compatible optical system) have been provided. However, such a conventional CD/DVD-compatible optical system can not correct a coma which changes depending on the thickness of the cover layer of the optical disc. Further, astigmatism is not corrected in the CD/DVD compatible optical system as in the case of the optical system of each of the publications.

It is understood that the optical system disclosed in each of the publications can not be used as the CD/DVD-compatible optical system because the amount of a coma changes depending on the thickness of the cover layer of the optical disc.

SUMMARY OF THE INVENTION

The present invention is advantageous in that it provides an optical system for optical discs configured to sufficiently suppress aberrations without using a coupling lens.

According to an aspect of the invention, there is provided an optical system for recording data to and/or reproducing data from an optical disc which requires a numerical aperture on an optical disc side larger than or equal to 0.60. The optical system is provided with a light source that emits a diverging light beam, an objective lens that converges the diverging light beam onto a data recording surface of the optical disc, and a driving system that controls a position and an attitude of the objective lens.

In this structure, the driving system operates to move the objective lens in a direction perpendicular to a central axis of the objective lens for a tracking operation, and to change the attitude of the objective lens during the tracking operation so that the central axis on a light source side tilts toward the light source.

Since the attitude of the objective lens can be changed concurrently with tracking shift movement of the objective lens by the tracking operation, astigmatism caused by the tracking shift movement of the objective lens can be suppressed. Consequently, recording/reproducing operation for an optical disc (which requires a relatively high numerical aperture) can be performed with high accuracy.

It is noted that the correction of the astigmatism can be attained by only changing the attitude of the objective lens in the optical system, and it is not required to change the configuration of the objective lens for the correction of the astigmatism.

Therefore, there is no factor that deteriorates optical performance of the optical system in a condition in which the objective lens is located at a reference position (i.e. the tracking operation is not performed).

Optionally, the driving system may control the position and the attitude of the objective lens to satisfy a condition:

$$0.25 \leq d \cdot \tan \theta / TR \leq 0.75 \tag{1}$$

where d (mm) represents a distance on an air basis between the light source and the data recording surface of the optical disc, TR (mm) represents a shifting amount of an object image caused by tracking shift movement of the objective lens by the tracking operation, and θ (°) represents a tilting amount of the objective lens with respect to a reference axis of the optical system.

Still optionally, the objective lens may be configured to satisfy a condition:

$$-0.75 \leq CM_D/CM_L \leq -0.15 \tag{2}$$

where $CM_L$ represents sensitivity of a coma caused when only the objective lens tilts with respect to the light beam from the light source, and $CM_D$ represents sensitivity of a coma caused when only the optical disc tilts with respect to the light beam passed through the objective lens.

Still optionally, the optical system may satisfy a condition:

$$-0.30 \leq (CM_D/CM_L) \cdot d \cdot \tan \theta / TR \leq -0.15 \tag{3}$$

where d (mm) represents a distance on an air basis between the light source and the data recording surface of the optical disc, TR (mm) represents a shifting amount of an object image caused by tracking shift movement of the objective lens by the tracking operation, θ (°) represents a tilting amount of the objective lens with respect to a reference axis of the optical system, $CM_L$ represents sensitivity of a coma caused when only the objective lens tilts with respect to the light beam from the light source, and $CM_D$ represents sensitivity of a coma caused when only the optical disc tilts with respect to the light beam passed through the objective lens.

According to another aspect of the invention, there is provided an optical system for recording data to and/or reproducing data from a plurality of types of optical discs. The optical system is provided with a plurality of light sources that emit diverging light beams respectively corresponding to the plurality of types of optical discs, an objective lens that converges each of the diverging light beams onto a data recording surface of corresponding one of the plurality of types of optical discs, and a driving system that controls a position and an attitude of the objective lens.

In this structure, the driving system operates to move the objective lens in a direction perpendicular to a central axis of the objective lens for a tracking operation, and to change the attitude of the objective lens during the tracking operation so that the central axis on a light source side tilts toward corresponding one of the plurality of the plurality of light sources at least when a first optical disc having a thinnest cover layer of the plurality of types of optical discs is used.

Since the attitude of the objective lens can be changed concurrently with tracking shift movement of the objective lens by the tracking operation, astigmatism caused by the tracking shift movement of the objective lens can be suppressed. Consequently, recording/reproducing operation for an optical disc (which requires a relatively high numerical aperture) can be performed with high accuracy.

Optionally, the driving system may change the attitude of the objective lens to satisfy a condition:

$$-0.1 \leq \theta_2/\theta_1 \leq 1 \tag{4}$$

where $\theta_1$ (°) represents a tilting amount of the objective lens during tracking shift movement of the objective lens by the tracking operation when the first optical disc is used, $\theta_2$ (°) represents a tilting amount of the objective lens during tracking shift movement of the objective lens by the tracking operation when a second optical disc of the plurality of types of optical discs having a cover layer thicker than that of the first optical disc is used.

Still optionally, the driving system may change the attitude of the objective lens to satisfy a condition:

$$\theta_2/\theta_1 = 0 \tag{5}$$

In a particular case, the first optical disc may require a numerical aperture on an optical disc side larger than or equal to 0.60.

In a particular case, the second optical disc may have a thickest cover layer of all of the plurality of types of optical discs.

Still optionally, when the first optical disc is used, the driving system may control the position and the attitude of the objective lens to satisfy a condition:

$$0.25 \leq d_1 \cdot \tan \theta_1 / TR \leq 0.75 \tag{6}$$

where $d_1$ (mm) represents a distance on an air basis between a first light source of the plurality of the light sources used for the first optical disc and a data recording surface of the first optical disc, TR (mm) represents a shifting amount of an object image caused by tracking shift movement of the objective lens by the tracking operation, and $\theta_1$ (°) represents a tilting amount of the objective lens with respect to a reference axis of the optical system when the first optical disc is used.

Still optionally, the objective lens may be configured to satisfy a condition:

$$-0.75 \leq CM_{D1}/CM_{L1} \leq -0.15 \tag{7}$$

where $CM_{L1}$ represents sensitivity of a coma caused when only the objective lens tilts with respect to a first light beam emitted by one of the plurality of light sources for the first optical disc, and $CM_{D1}$ represents sensitivity of a coma caused when only the first optical disc tilts with respect to the first light beam passed through the objective lens.

Still optionally, the optical system may satisfy a condition:

$$-0.30 \leq (CM_{D1}/CM_{L1}) \cdot d_1 \cdot \tan \theta_1 / TR \leq -0.15 \tag{8}$$

where $d_1$ (mm) represents a distance on an air basis between a first light source of the plurality of the light sources used for the first optical disc and a data recording surface of the first optical disc, TR (mm) represents a shifting amount of an object image caused by tracking shift movement of the objective lens by the tracking operation, $\theta_1$ (°) represents a tilting amount of the objective lens with respect to a reference axis of the optical system when the first optical disc is used, $CM_{L1}$ represents sensitivity of a coma caused when only the objective lens tilts with respect to a first light beam emitted by the first light source, and $CM_{D1}$ represents sensitivity of a coma caused when only the first optical disc tilts with respect to the first light beam passed through the objective lens.

Still optionally, the objective lens may be configured to satisfy a condition:

$$-1.50 \leq CM_{D2}/CM_{L2} \leq -0.50 \quad (9)$$

where $CM_{L2}$ represents sensitivity of a coma caused when only the objective lens tilts with respect to a second light beam emitted by one of the plurality of light sources used for a second optical disc of the plurality of types of optical discs having a cover layer thicker than that of the first optical disc, and $CM_{D2}$ represents sensitivity of a coma caused when only the second optical disc tilts with respect to the second light beam passed through the objective lens.

In a particular case, the plurality of light sources may be located at positions shifted with respect to each other in a plane perpendicular to an emitting direction of each of the diverging light beams. In this case, the plurality of light sources may be aligned in a direction perpendicular to a direction in which an object image formed by the objective lens shifts in accordance with tracking shift movement of the objective lens by the tracking operation.

Still optionally, the optical system may include a detecting system that detects a type of an optical disc being used. In this case, the driving system sets a changing amount of the attitude of the objective lens responsive to tracking shift movement of the objective lens by the tracking operation and a detection result of the detecting system.

Still optionally, the plurality of light sources may be located at positions shifted with respect to each other in a plane perpendicular to an emitting direction of each of the diverging light beams. In this case, the driving system may move the objective lens in the tracking operation with respect to a reference position which is defined for each of the plurality of light sources, the reference position being defined as a position at which the central axis of the objective lens passes through one of the plurality of light sources corresponding to a type of an optical disc being used.

In a particular case, the plurality of light sources may be aligned in a direction in which an object image formed by the objective lens shifts in accordance with tracking shift movement of the objective lens by the tracking operation.

Still optionally, the optical system may include a detecting system that detects the type of the optical disc being used. In this case, the driving system may set a changing amount of the attitude of the objective lens responsive to tracking shift movement of the objective lens by the tracking operation and a detection result of the detecting system, and may determine the reference position for the optical disc being used based on the detection result of the detecting system.

According to another aspect of the invention, there is provided an optical system for recording data to and/or reproducing data from two types of optical discs including a first optical disc and a second optical disc whose cover layer is approximately twice as thick as that of the first optical disc. The optical system is provided with a plurality of light sources that emit diverging light beams respectively corresponding to the first and second optical discs, an objective lens that converges each of the diverging light beams onto a data recording surface of corresponding one of the first and second optical discs, and a driving system that controls a position and an attitude of the objective lens. The objective lens has sensitivity of a coma caused by a cover layer of the second optical disc. The driving system operates to move the objective lens in a direction perpendicular to a central axis of the objective lens for a tracking operation.

Further, when the first optical disc is used, the driving system operates to change the attitude of the objective lens during the tracking operation so that the central axis on a light source side tilts toward one of the light sources used for the first optical disc by an amount which is approximately half of a tilting amount by which astigmatism caused by tracking shift movement of the objective lens by the tracking operation is substantially completely corrected. When the second optical disc is used, the driving system operates not to change the attitude of the objective lens during the tracking operation.

Since the attitude of the objective lens can be changed concurrently with tracking shift movement of the objective lens by the tracking operation, astigmatism caused by the tracking shift movement of the objective lens can be suppressed. Consequently, recording/reproducing operation for an optical disc (which requires a relatively high numerical aperture) can be performed with high accuracy.

BRIEF DESCRIPTION OF THE
ACCOMPANYING DRAWINGS

FIG. 1 schematically shows an optical system according to a first embodiment of the invention;

FIG. 2 shows a situation in which a position and an attitude of an objective lens in the optical system have been adjusted by a lens actuating mechanism;

FIG. 3 schematically shows an optical system according to a second embodiment of the invention;

DETAILED DESCRIPTION OF THE EMBODIMENTS

Hereinafter, embodiments according to the invention are described with reference to the accompanying drawings.

First Embodiment

Figure 1:
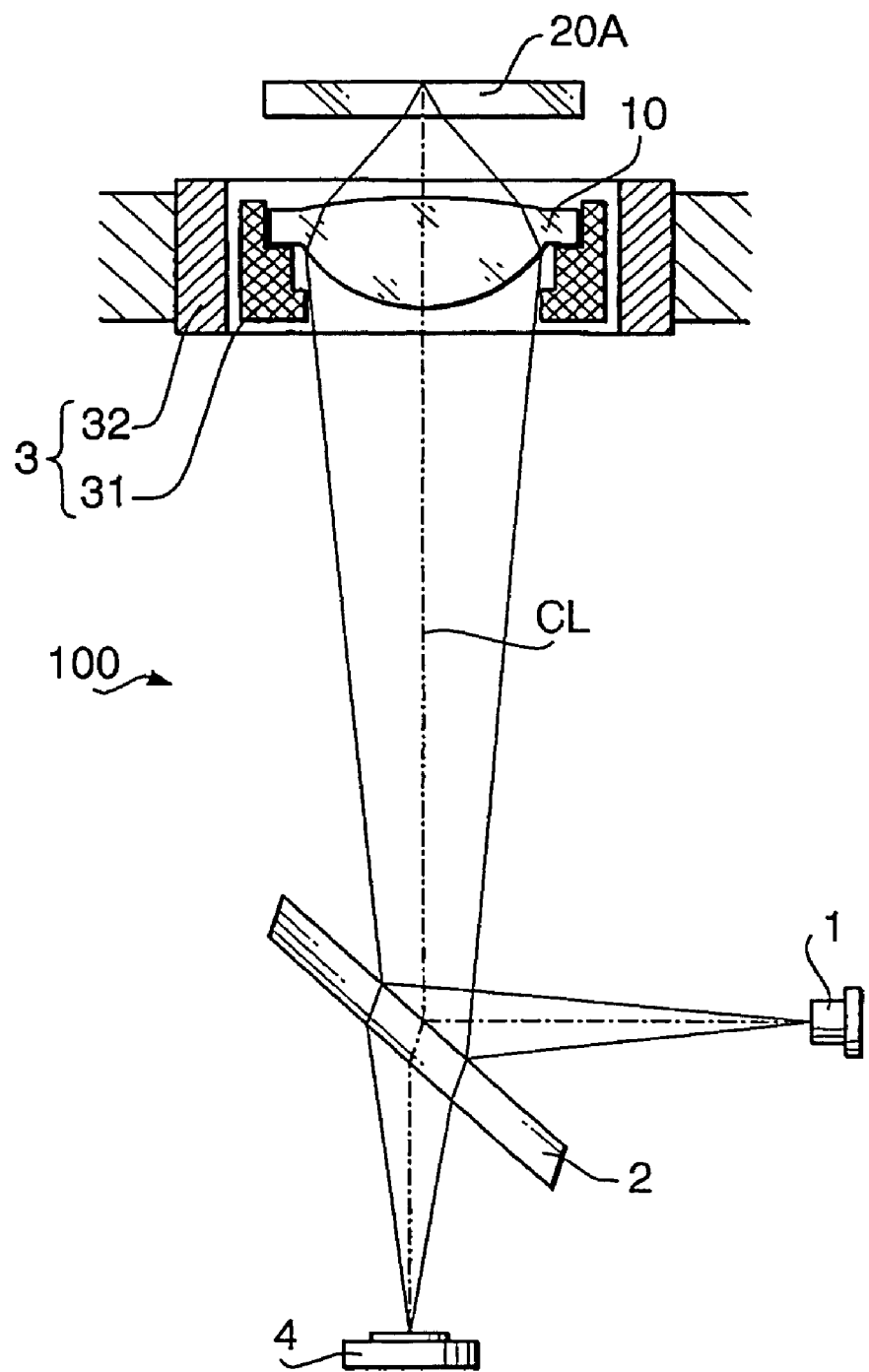

FIG. 1 schematically shows an optical system 100 according to a first embodiment of the invention. The optical system 100 is used for recording data to and/or reproducing data from an optical disc 20A (e.g. DVD) having a relatively high recording density and a relatively thin cover layer. The optical system 100 is employed in an optical disc drive which records data to and/or reproduces data from the optical disc 20A.

As shown in FIG. 1, the optical system 100 is provided with a light source 1, a beam splitter 2, a lens actuating mechanism 3, a sensor 4 and an objective lens 10. The optical system 100 is configured as a finite optical system which does not use a coupling lens. That is, a laser beam emitted by the light source 1 is converged only by the objective lens 10.

The light source 1 emits the laser beam having a relatively short wavelength suitable for the optical disc 20A so that the laser beam passed through the beam splitter 2 and the objective lens 10 forms a relatively small beam spot on a data recording surface of the optical disc 20A. A returning beam (an optical signal) from the optical disc 20A is then received by the sensor 4. The optical signal received by the sensor 4 is then processed by a signal processing unit (not shown in FIG. 1) to perform recording/reproducing operation for the optical disc 20A.

The lens actuating mechanism 3 includes a lens holder 31 which holds the objective lens 10, and an actuator 32 which makes a fine adjustment to an attitude and a position of the objective lens 10.

Figure 2:
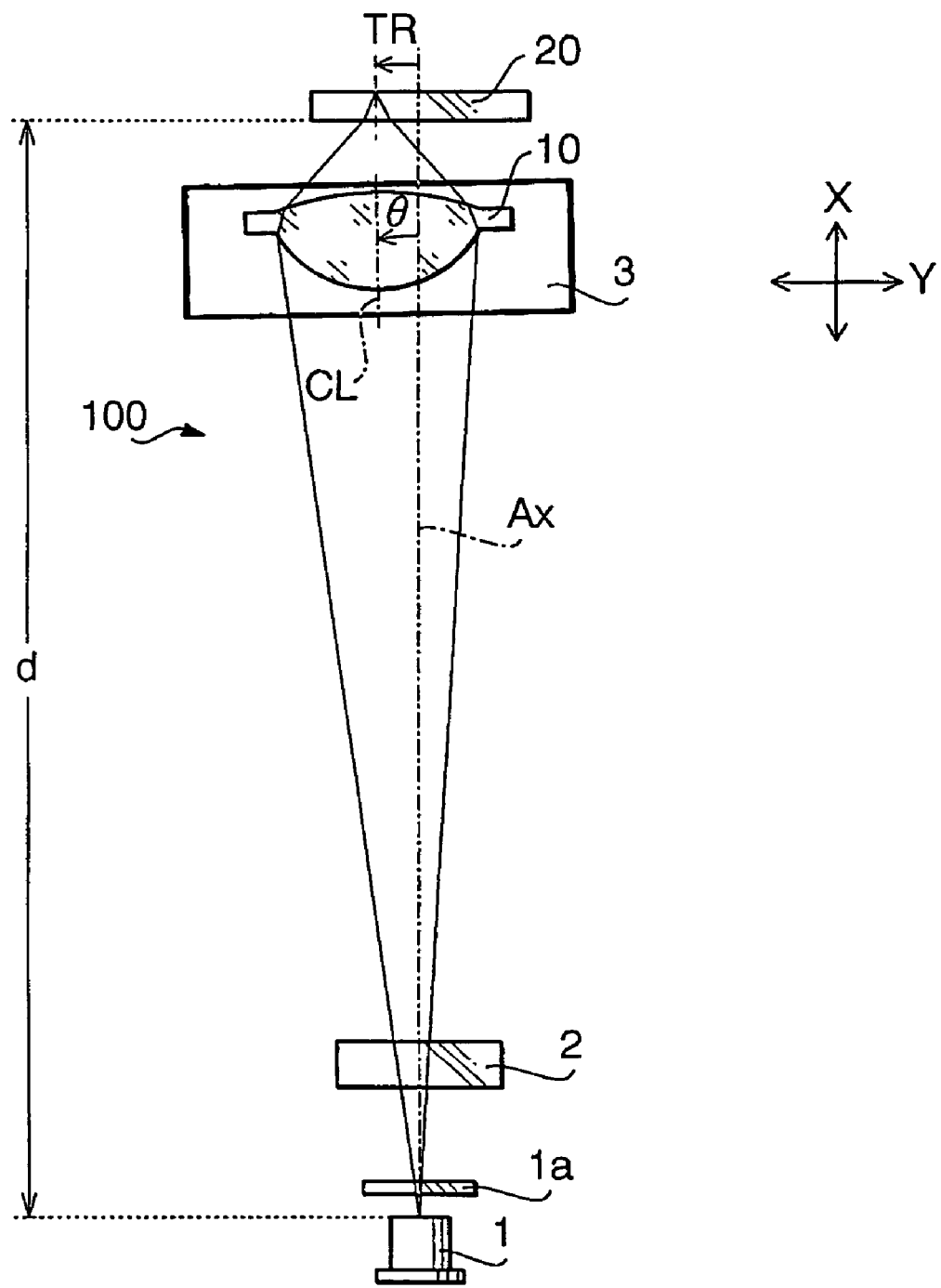

FIG. 2 shows a situation in which the position and the attitude of the objective lens 10 have been adjusted by the lens actuating mechanism 3. In FIG. 2, an optical path (reference axis Ax) is developed as a linear line for the sake of simplicity. The reference axis is regarded as a linear line when a positional relationship between each optical component and the reference axis is explained.

The lens actuating mechanism 3 moves the objective lens 10 in a X-direction for a focusing operation, and moves the objective lens 10 in a Y-direction for a tracking operation. By this structure, a stable recording/reproducing operation can be accomplished if a shift of a focus and a shift of tracking due to tilting, warpage or deviation of an optical disc occur.

A diffraction grating 1a is located between the light source 1 and the beam splitter 2. The diffraction grating 1a is configured to generate a sub beam used to detect a shift of tracking in three beam method.

The lens actuating mechanism 3 tilts the objective lens 10 concurrently with tracking shift movement of the objective lens 10 by the tracking operation so that a central axis (CL) of the objective lens 10 tilts toward the light source 1. That is, the objective lens 10 is tilted so that a front surface (a light source side surface) thereof faces the light source 1. Consequently, astigmatism caused by the tracking shift movement of the objective lens by the tracking operation is effectively cancelled by astigmatism caused by tilting movement of the objective lens 10.

More specifically, the tilting amount is set to an amount smaller than a tilting amount at which a hypothetical point source is located on the central axis CL of the objective lens 10. That is, the lens actuating mechanism 3 controls the position and the attitude of the objective lens 10 to satisfy a following condition:

$$0.25 \leq d \cdot \tan \theta / TR \leq 0.75 \tag{1}$$

where d (mm) represents a distance on an air basis between the light source 1 and the data recording surface of the optical disc 20A, TR (mm) represents a shifting amount of an object image due to the tracking shift movement of the objective lens 10, and θ (°) represents the tilting amount of the objective lens 10 (see FIG. 2). The tilting amount θ is an angle formed between the central axis CL of the objective lens 10 and the reference axis Ax.

The condition (1) defines the tilting amount of the objective lens 10 during the tracking shift movement of the objective lens 10. If the tilting amount is set so that d·tan θ/TR takes a value of 1.0, the astigmatism is completely corrected. However, if the tilting amount is set so that d·tan θ/TR takes a value of 1.0, a relatively large amount of coma caused in the cover layer of the optical disc 20A remains. By satisfying the condition (1), it becomes possible to suppress the occurrence of the coma and to sufficiently correct the astigmatism.

If d·tan θ/TR gets lower than the lower limit of the condition (1), i.e. if the tilting amount is small, the astigmatism is not sufficiently corrected. In addition, if the tilting amount is small and a high order coma occurs in the objective lens 10, a relatively large amount of coma remains.

If d·tan θ/TR gets larger than the upper limit of the condition (1), i.e. if the tilting amount is large, a coma caused in the objective lens 10 remains. Further, in this case, a coma caused by a tilting amount error introduced by the lens actuating mechanism 3 produces an excessively large amount of coma.

Such a tilting amount error can be reduced by enhancing a driving accuracy of the lens actuating mechanism 3. However, enhancement of the driving accuracy increases the cost of the lens actuating mechanism 3. By satisfying the condition (1), an increase in cost of the lens actuating mechanism 3 can be avoided.

By driving the objective lens 10 to satisfy the condition (1), astigmatism caused when off-axis light is incident on the objective lens 10 can be sufficiently suppressed. For example, if the tilting amount is set so that an expression (d·tan θ/TR) of the condition (1) takes a value of 0.3, the amount of the astigmatism can be reduced to a half of the amount of astigmatism caused in a situation in which the objective lens 10 is not tilted. If the tilting amount is set so that the expression (d·tan θ/TR) of the condition (1) takes a value of 0.5, the amount of the astigmatism can be reduced to a quarter of the amount of astigmatism caused in the situation in which the objective lens 10 is not tilted.

Accordingly, the astigmatism can be reduced to a sufficiently low level which allows the optical system 100 to perform the recording/reproducing operation for the optical disc requiring high numerical aperture (NA) with high accuracy.

Both surfaces (the front surface and a rear surface) of the objective lens 10 are aspherical surfaces.

In addition to the above mentioned configuration, the objective lens 10 may be configured to satisfy a following condition:

$$-0.75 \leq CM_D/CM_L \leq -0.15 \tag{2}$$

where $CM_L$ represents sensitivity of a coma caused when only the objective lens 10 tilts with respect to the laser beam from the light source 1, and $CM_D$ represents sensitivity of a coma caused when only the optical disc tilts with respect to the laser beam passed through the objective lens 10.

For making a comparison with an objective lens in a conventional optical system, a configuration of the objective lens in the conventional optical system is explained below. In general, when the objective lens is mounted on the conventional optical system in a manufacturing process of the optical system, a position of the objective lens is adjusted with respect to a light source and an optical disc so that a central axis of the objective lens substantially coincides with a chief ray of a light beam from the light source and perpendicularly intersects with the optical disc.

The objective lens is designed so that a coma is not caused even if an off-axis ray is incident on the objective lens. More specifically, the objective lens in the conventional optical system is designed so that the amount of coma caused when the objective lens tilts with respect to an incident beam and the amount of coma caused when the optical disc tilts with respect to the incident beam have the same absolute value and opposite singes (i.e. $CM_D/CM_L \cong -1$). It is understood that in this case, both of the two comas cancel with respect to each other and thereby the total amount of coma is sufficiently corrected.

However, if the objective lens is tilted to correct the astigmatism, a tilting amount of the objective lens with respect to the chief ray of the light beam from the light source and a tilting amount of the optical disc with respect to the chief ray of the light beam from the light source become different from each other. Therefore, if the two comas have the same absolute value and different signs (i.e. $CM_D/CM_L \cong -1$), the amount of coma increases even though the astigmatism is sufficiently corrected. For this reason, in this embodiment, the objective lens 10 is configured to satisfy the condition (2).

If $CM_D/CM_L$ gets lower than the lower limit of the condition (2), i.e. if sensitivity of the coma caused by a tilt of the objective lens 10 is excessively low, the large amount of coma remains even though the astigmatism can be sufficiently corrected.

If $CM_D/CM_L$ gets larger than the upper limit of the condition (2), i.e. if sensitivity of the coma caused by a tilt of the objective lens 10 is excessively high, the amount of coma caused by the tilting amount error becomes excessively large.

As used herein, the sensitivity ($CM_L$, $CM_D$) is a coefficient of a term corresponding to a third order coma of terms obtained by developing, using a Zernike polunomial, a wavefront aberration caused when the objective lens and the optical disc tilt by 1° with respect to the incident beam. When the wavefront aberration is expressed by an rms (root mean square) value, the following relationship holds between the coefficient of the third order coma (CM3) and the rms value.

$$\text{rms value} = \frac{1}{\sqrt{8}} \times |CM\ 3|$$

By configuring the objective lens 10 to satisfy the condition (2), a coma caused when off-axis light is incident on the objective lens 10 which has been shifted by the tracking operation is sufficiently suppressed. In particular, if the objective lens 10 is configured such that an expression ($CM_D/CM_L$) of the condition (2) takes a value of approximately −0.5, a balance is achieved between correction of the coma and the correction of the astigmatism.

The above mentioned conditions (1) and (2) are generalized as a following condition (3).

$$-0.30 \leq (CM_D/CM_L) \cdot d \cdot \tan\theta / TR \leq -0.15 \quad (3)$$

By configuring the optical system to satisfy the condition (3), both of the astigmatism and the coma are sufficiently suppressed.

If the condition (3) is not satisfied, the balance between the effect of the correction of the astigmatism and the effect of the correction of the coma can not be achieved.

Second Embodiment

Figure 3:
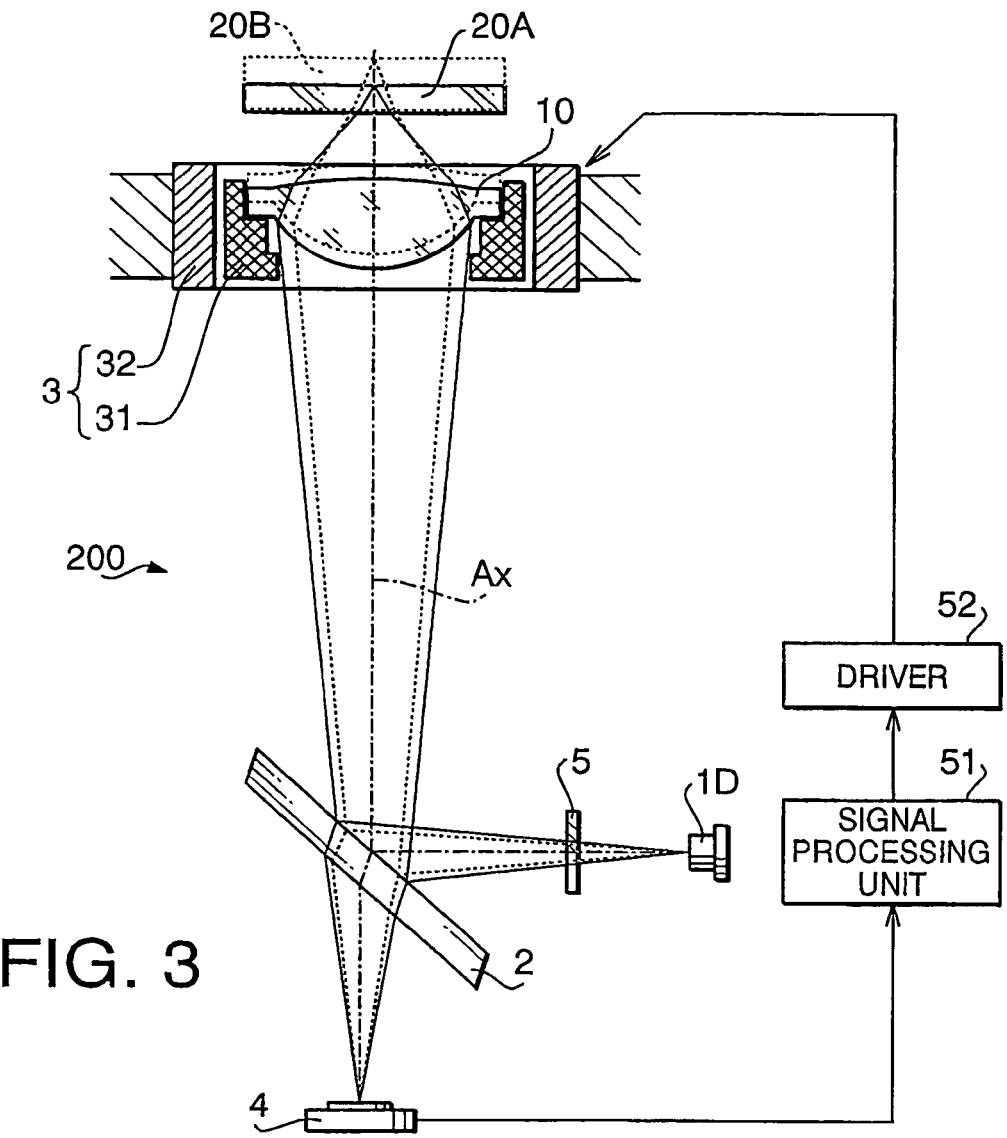

FIG. 3 schematically shows an optical system 200 according to a second embodiment of the invention. The optical system 200 is used for recording data to and/or reproducing data from a plurality of types of optical discs having different thicknesses of cover layers. In FIG. 3, to elements which are similar to those shown in FIG. 1, the same reference numbers are assigned, and the detailed description thereof will not be repeated.

As examples of the plurality of types of optical discs, the optical disc 20A (e.g. DVD) and an optical disc 20B (e.g. CD or CD-R) which has a lower recording density than that of the optical disc 20A and has a cover layer thicker than that of the optical disc 20A are illustrated. The optical system 200 is employed in an optical disc drive which records data to and/reproduces data from the plurality of types of optical discs.

As shown in FIG. 3, the optical system 200 includes a light source 1D, a diffraction grating 5, the beam splitter 2, the lens actuating mechanism 3, the sensor 4 and the objective lens 10. For supporting both of the optical discs 20A and 20B, the light source 1D has two emitting portions respectively emitting laser beams having a wavelength for the optical disc 20A and a wavelength for the optical disc 20B.

The two emitting portions are located at positions slightly shifted with respect to each other in a plane perpendicular to the reference axis Ax.

The diffraction grating 5 is located between the light source 1D and the beam splitter 2. The diffraction grating 5 is configured to generate a sub beam used to detect a shift of tracking in three beam method.

Both surfaces (the front surface and the rear surface) of the objective lens 10 according to the second embodiment are aspherical surfaces. In addition, one of the front and rear surfaces of the objective lens 10 is provided with a diffracting structure having a plurality of annular zones which are divided by steps and are concentrically formed about the central axis.

The function of the diffracting structure allows the optical system 200 to support both of the optical discs 20A and 20B. Also, the objective lens 10 is provided with the function of limiting an aperture size so that the aperture size is suited for each of numerical apertures for the optical discs 20A and 20B. By this structure, numerical apertures respectively suitable for the optical discs 20A and 20B are accomplished and thereby the beam spots suitable for the optical discs 20A and 20B are formed on the data recording surfaces of the optical discs 20A and 20B, respectively.

Similarly to the first embodiment, the lens actuating mechanism 3 moves the position and the attitude of the objective lens 10, so that the stable recording/reproducing operation is attained even if a shift of a focus or a shift of tracking is caused by a difference of a working distance between the optical discs 20A and 20B. Such a difference of a working distance is introduced by a different thickness of the cover layer of the optical disc being used as well as the tilting, warpage or deviation of the optical disc.

In FIG. 3, a position of the objective lens 10 during use of the optical disc 20A is represented by a solid line, and a position of the objective lens 10 during use of the optical disc 20B is represented by a broken line.

Similarly to the first embodiment, the lens actuating mechanism 3 tilts the objective lens 10 concurrently with the tracking shift movement of the objective lens 10 by the tracking operation so that the central axis (CL) of the objective lens 10 tilts toward the light source 1D (in a situation in which the optical system is developed). That is, the objective lens 10 is tilted so that the front surface thereof faces the light source 1D (i.e. one of emitting portions corresponding to the optical disc being used). Consequently, the coma and astigmatism caused when the objective lens 10 is shifted by the tracking operation are sufficiently corrected by tilting the objective lens 10.

More specifically, the optical system 200 is configured to satisfy the following conditions:

$$0.25 \leq d_1 \cdot \tan\theta_1 / TR \leq 0.75 \quad (6)$$

$$-0.75 \leq CM_{D1}/CM_{L1} \leq -0.15 \quad (7)$$

$$-0.30 \leq (CM_{D1}/CM_{L1}) \cdot d_1 \cdot \tan\theta_1 / TR \leq -0.15 \quad (8)$$

In the conditions (6) through (8), $d_1$ (mm) represents a distance on an air basis between the light source 1D and the data recording surface of the optical disc 20A, TR (mm) represents a shifting amount of an object image due to the tracking shift movement of the objective lens 10, $\theta_1$ (°) represents the tilting amount of the objective lens 10 (see FIG. 2). The $CM_{L1}$ represents sensitivity of a coma caused when only the objective lens 10 tilts with respect to the laser beam for the optical disc 20A from the light source 1D, and $CM_{D1}$ represents sensitivity of a coma caused when only the optical disc 20A tilts with respect to the laser beam for the optical disc 20A passed through the objective lens 10. That is, a numeral subscript "1" in each of coefficients "$d_1$", "$\tan\theta_1$", "$CM_{D1}$" and "$CM_{L1}$" denotes that the coefficients are used when the optical disc 20A is used.

A numerical aperture required for the recording/reproducing operation for the optical disc 20B is relatively small. Therefore, in the case of the optical disc 20B, the tilting amount can be reduced in comparison with the tilting amount required for the optical disc 20A because the amount of residual astigmatism is sufficiently small even if the tilting is not performed and the residual astigmatism is practically negligible.

For this reason, in the recording/reproducing operation for the optical disc 20B, the tilting amount of the objective lens 10 during the tracking shift movement of the objective lens 10 is set to an amount smaller than or equal to the tilting amount of the objective lens 10 in the recording/reproducing operation of the optical disc 20A, or to zero.

In addition to the above mentioned configuration, the objective lens 10 may be configured to satisfy a following condition:

$$-1.50 \leq CM_{D2}/CM_{L2} \leq -0.50 \quad (9)$$

where $CM_{L2}$ represents sensitivity of a coma caused when only the objective lens 10 tilts with respect to the laser beam for the optical disc 20B from the light source 1D, and $CM_{D2}$ represents sensitivity of a coma caused when only the optical disc 20B tilts with respect to the laser beam for the optical disc 20B passed through the objective lens 10. That is, a numeral subscript "2" in each of coefficients "$CM_{D2}$" and "$CM_{L2}$" denotes that the coefficients are used when the optical disc 20B is used.

By configuring the optical system to satisfy the condition (9), both of the astigmatism and the coma caused when the optical disc 20B is used are sufficiently suppressed.

If $CM_{D2}/CM_{L2}$ gets lower than the lower limit of the condition (9), the coma caused by the tracking shift movement of the objective lens 10 when the optical disc 20B is used becomes excessively large.

If $CM_{D2}/CM_{L2}$ gets larger than the upper limit of the condition (9), the sensitivity of the coma to the tilt of the objective lens 10 becomes excessively large and thereby the amount of the coma cased by the tilting amount error becomes excessively large.

If the optical system 200 is configured not to tilt the objective lens 10 during the tracking shift movement of the objective lens 10 when the optical disc 20B is used, it is preferable that $CM_{D2}/CM_{L2}$ in the condition (9) takes a value of −1 because in this case the coma is corrected most sufficiently.

One practical numerical example of the optical system 100 is that $d_1 \cdot \tan\theta_1/TR = 0.5$ and $CM_D/CM_L = -0.5$. In such a case, both of the correction of the coma and the correction of the astigmatism are effectively attained.

With regard to the tilting amount of the objective lens 10, the optical system 200 satisfies a condition (4).

$$-0.1 \leq \theta_2/\theta_1 \leq 1 \quad (4)$$

In the above condition (4), $\theta_1$ (°) represents the tilting amount of the objective lens 10 during the tracking shift movement of the objective lens 10 in the recording/reproducing operation of the optical disc 20A, $\theta_2$ (°) represents the tilting amount of the objective lens 10 during the tracking shift movement of the objective lens 10 in the recording/reproducing operation of the optical disc 20B.

When the condition (4) is not satisfied, the coma remains and thereby it becomes difficult to perform the recording/reproducing operation with high accuracy.

If the tilting amount of the objective lens 10 during the tracking shift movement of the objective lens 10 in the recording/reproducing operation of the optical disc 20B is set to zero, the following condition (5) is satisfied.

$$\theta_2/\theta_1 = 0 \quad (5)$$

When the condition (5) is satisfied, control of the lens actuating mechanism 3 can be simplified.

In FIG. 3, a signal processing unit 51 and a driver 52 connected to the lens actuating mechanism 3 are also shown. As mentioned in the first embodiment, the signal processing unit 51 processes an optical signal received by the sensor 4 to perform the recording/reproducing operation for the optical discs 20A and 20B.

As described above, the light source 1D has the two emitting portions located at positions slightly shifted with respect to each other in the plane perpendicular to the reference axis Ax (i.e. an emitting direction of each of the laser beams from the light source 1D).

One example of an arrangement of the two emitting portions is that the two emitting portions are aligned in a direction perpendicular to a direction in which the object image shifts in accordance with the tracking shift movement of the objective lens 10. In this case, a component of a change of an object height introduced by a positional shift of the two emitting portions becomes perpendicular to a component of a change of an object height introduced by the tracking shift movement of the objective lens 10. Consequently, it becomes possible to avoid an excessive increase of the amount of the aberration during the tracking shift movement of the objective lens 10.

Another example of the arrangement of the two emitting portions of the light source 1D is that the two emitting portions are aligned in the direction in which the object image shifts in accordance with the tracking shift movement of the objective lens 10.

The lens actuating mechanism 3 may be configured to shift the objective lens in the tracking operation with respect to a reference position defined for each of the two emitting portions. That is, when the optical disc 20A is used, the lens actuating mechanism 3 moves the objective lens 10 with reference to a first reference position at which an extension of the central axis of the objective lens 10 exactly passes through one of the two emitting portions corresponding to the optical disc 20A (in a condition in which the optical system 200 is developed).

Further, when the optical disc 20B is used, the lens actuating mechanism 3 moves the objective lens 10 with respect to a second reference position at which an extension of the central axis of the objective lens 10 exactly passes through one of the two emitting portions corresponding to the optical disc 20B (in a condition in which the optical system 200 is developed).

By performing the tracking operation with reference to each reference position, the aberrations can be reduced to minimum levels.

When the lens actuating mechanism 3 is configured to adjust the reference positions as mentioned above, it is preferable that the two emitting portions of the light source 1D are aligned in the direction in which the object image shifts in accordance with the tracking shift movement of the objective lens 10. In this case, a moving direction of the objective lens 10 for adjustment of the reference positions coincides with the direction of the tracking shift movement of the objective lens 10.

Therefore, in this case, the lens actuating mechanism 3 is not required to have an additional driving axis for moving the objective lens 10 for the adjustment of the reference positions. Consequently, it becomes possible to prevent the lens actuating mechanism 3 from becoming complicated.

The optical system 200 may be provided with the function of detecting the type of the optical disc being used. In this embodiment, the signal processing unit 51 is provided with the function of detecting the type of the optical disc being used, and controlling the light source 1D and the lens actuating mechanism 3 via the driver 52 based on a detection result.

More specifically, when it is detected by the signal processing unit 51 that the optical disc 20A is used, the signal processing unit 51 controls the light source 1D to emit the laser beam for the optical disc 20A and controls the lens actuating mechanism 3 via the driver 52 to change the position and the attitude of the objective lens 10 for the recording/reproducing operation of the optical disc 20A. When it is detected by the signal processing unit 51 that the optical disc 20B is used, the signal processing unit 51 controls the light source 1D to emit the laser beam for the optical disc 20B and controls the lens actuating mechanism 3 via the driver 52 to change the position and the attitude of the objective lens 10 for the recording/reproducing operation of the optical disc 20B.

When the lens actuating mechanism 3 is configured to adjust the reference positions as mentioned above, such an adjustment operation can be performed based on the detection result of the detecting function.

It should be noted that the detecting function of the signal processing unit 51 can be accomplished by processing a signal outputted by the sensor 4 (which receives the optical signal returning from the optical disc). For example, the detecting function is accomplished by obtaining an interval (distance on the sensor 4) between returning light reflected from a surface of the optical disc (20A or 20B) to the sensor 4 and returning light reflected from a data recording surface of the optical disc to the sensor 4, determining the thickness of the optical disc based on the obtained interval on the sensor 4, and then determining the type of the optical disc in accordance with the determined thickness.

Hereafter, one concrete example (first example) according to the first embodiment and five concrete examples (second through sixth examples) according to the second embodiment will be described.

FIRST EXAMPLE

An optical system according to a first example has a configuration described in the first embodiment with reference to FIG. 1. Therefore, the first example will be explained with reference to FIG. 1. Table 1 shows performance specifications of the optical system 100 according to the first example, and Table 2 shows a numerical configuration of the optical system 100 according to the first example.

TABLE 1

|  | Optical Disc 20A |
| --- | --- |
| DESIGN WAVELENGTH λ (nm) | 655 |
| NA | 0.620 |
| M | −0.143 |
| THICKNESS OF COVER LAYER (mm) | 0.60 |

In Table 1, M represents the magnification, the design wavelength is a wavelength suitable for the recordation/reproduction of the optical disc being used, NA is a numerical aperture on the optical disc side. These symbols are also applied to similar tables in concrete examples indicated below.

TABLE 2

| Surface Number | r | d | n | ν |
| --- | --- | --- | --- | --- |
| #0 |  | 0.50 |  |  |
| #1 |  | 0.25 | 1.516 | 64.2 |
| #2 |  | 11.32 |  |  |
| #3 | 1.129 | 1.20 | 1.544 | 55.7 |
| #4 | −1.975 | 0.80 |  |  |
| #5 |  | 0.60 | 1.585 | 29.9 |
| #6 |  | — |  |  |

In Table 2, "surface number" represents a surface number of each surface of optical components in the optical system 100. The surface number #0 represents the light source 1, the surface numbers #1 and #2 respectively represent surfaces of a cover layer (not shown) of the light source 1, the surface numbers #3 and #4 respectively represent the front and rear surfaces of the objective lens 10, and the surface numbers #5 and #6 respectively represent the cover layer and data recording surface of the optical disc 20A.

In Table 2, "r" represents a radius of curvature (unit: mm) of each lens surface on the optical axis, "d" represents a thickness of a lens or a distance (unit: mm) from a lens surface to a next lens surface, "n" represents a refractive index at a d-ray (588 nm), and "ν" represents an Abbe constant at the d-ray. These symbols are also applied to similar tables in concrete examples indicated below.

Each of the front (#3) and rear (#4) surfaces of the objective lens 10 is an aspherical surface. The aspherical surface is expressed by a following equation:

$$X(h) = \frac{Ch^2}{1 + \sqrt{1 - (1+K)C^2h^2}} + A_4h^4 + A_6h^6 + A_8h^8 + A_{10}h^{10} + A_{12}h^{12}$$

where, X(h) represents a SAG amount which is a distance between a point on the aspherical surface at a height of h from the optical axis and a plane tangential to the aspherical surface at the optical axis, symbol C represents curvature (1/r) on the optical axis, K is a conical coefficient, and $A_4$, $A_6$, $A_8$, $A_{10}$ and $A_{12}$ are aspherical coefficients of fourth, sixth, eighth, tenth and twelfth orders, respectively.

Table 3 shows the conical coefficient and aspherical coefficients of the front and rear surfaces (#3 and #4) of the objective lens 10.

TABLE 3

| surface No. | K | A4 | A6 |
|---|---|---|---|
| #3 | −0.4700 | −2.4000E−02 | −4.0000E−03 |
| #4 | 0.0000 | 1.8250E−01 | −1.2330E−01 |

| | A8 | A10 | A12 |
|---|---|---|---|
| #3 | −3.1900E−03 | −2.9800E−03 | −2.3400E−04 |
| #4 | 6.6000E−02 | −2.1330E−02 | 3.3460E−03 |

In Table 3 (and in the following similar Tables), a notation symbol E indicates that 10 is used as a radix and a right side value of E is used as an exponent.

In the above mentioned numerical configuration of the first example. ($CM_{D1}/CM_{L1}$) is −0.528. The lens actuating mechanism 3 tilts and shifts the objective lens 10 so that (d·tan θ/TR) takes a value of 0.45 (d·tan θ/TR=0.45). Therefore, the expression ($CM_D/CM_L$)·d·tan θ/TR takes a value of −0.238. The optical system 100 according to the first example satisfies the conditions (1), (2) and (3).

Figure 4:
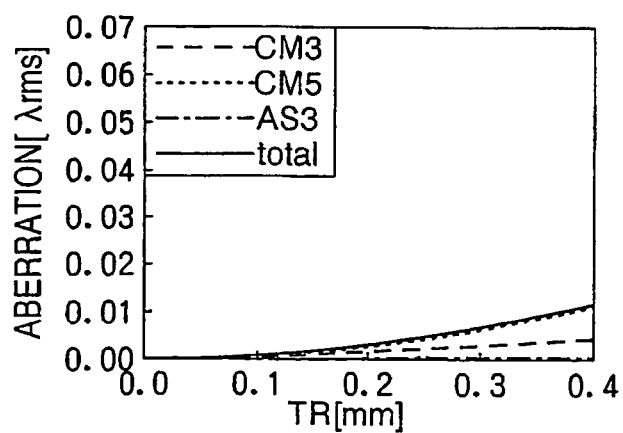
FIG. 4 is a graph illustrating amounts of asymmetric aberrations caused by tracking shift movement of the objective lens in a first example.

FIG. 4 is a graph illustrating amounts of asymmetric aberrations caused by the tracking shift movement of the objective lens 10. In FIG. 4 (and in the following similar graphs), a vertical axis represents the amount of aberration, and a horizontal axis represents the tracking amount of the objective lens 10. In FIG. 4 (and in the following similar graphs), "CM3" represents the coma of third order, "CM5" represents the coma of fifth order, "AS3" represents the astigmatism, and "total" represents a total amount of the aberrations.

As shown in FIG. 4, the coma and astigmatism (i.e. the aberrations having asymmetric property) are sufficiently suppressed even if the objective lens 10 is shifted by the tracking operation. According to the optical system 100 of the first example, the recording/reproducing operation can be performed with high precision.

SECOND EXAMPLE

An optical system according to a second example has the configuration described in the second embodiment with reference to FIG. 3. Therefore, the second example will be explained with reference to FIG. 3. Table 4 shows performance specifications of the optical system 200 according to the second example. Table 5 shows a numerical configuration of the optical system 200 of the second example when the optical disc 20A is used. Table 6 shows a numerical configuration of the optical system 200 of the second example when the optical disc 20B is used. Since the optical system 200 supports the optical disc 20A (e.g., DVD) and optical disc 20B (e.g., CD), in this example, the performance specifications and numerical configurations are indicated for each of the optical discs 20A and 20B.

TABLE 4

| | Optical Disc 20A | Optical Disc 20B |
|---|---|---|
| DESIGN WAVELENGTH λ (nm) | 655 | 790 |
| NA | 0.64 | 0.51 |
| M | −0.1334 | −0.1317 |
| THICKNESS OF COVER LAYER (mm) | 0.60 | 1.20 |

In Table 4, the design wavelength λ, the numerical aperture NA, the magnification M, and the thickness of the cover layer of the optical disc are shown for each of the case of the use of the optical disc 20A and the case of use of the optical disc 20B.

TABLE 5

| Surface Number | r | d | n | ν |
|---|---|---|---|---|
| #0 | | 0.50 | | |
| #1 | | 0.25 | 1.516 | 64.2 |
| #2 | | 2.00 | | |
| #3 | | 1.00 | 1.516 | 64.2 |
| #4 | | 15.62 | | |
| #5 (h ≦ 1.34) | 1.590 | 1.65 | 1.544 | 55.7 |
| #5 (h > 1.34) | 1.590 | 1.65 | 1.544 | 55.7 |
| #6 | −3.400 | 1.38 | | |
| #7 | | 0.60 | 1.585 | 29.9 |
| #8 | | — | | |

TABLE 6

| Surface Number | r | d | n | ν |
|---|---|---|---|---|
| #0 | | 0.50 | | |
| #1 | | 0.25 | 1.516 | 64.2 |
| #2 | | 2.00 | | |
| #3 | | 1.00 | 1.516 | 64.2 |
| #4 | | 15.99 | | |
| #5 (h ≦ 1.34) | 1.590 | 1.65 | 1.544 | 55.7 |
| #6 | −3.400 | 1.01 | | |
| #7 | | 1.20 | 1.585 | 29.9 |
| #8 | | — | | |

In Tables 5 and 6, "surface number" represents a surface number of each surface of optical components in the optical system 200. A surface number #0 represents the light source 1D, the surface numbers #1 and #2 respectively represent surfaces of a cover layer (not shown) of the light source 1D, surface numbers #3 and #4 respectively represent surfaces of the diffraction grating 5, the surface numbers #5 and #6 respectively represent the front and rear surfaces of the objective lens 10. In Table 5, the surface numbers #7 and #8 respectively represent the cover layer and data recording surface of the optical disc 20A. In Table 6, the surface numbers #7 and #8 respectively represent the cover layer and data recording surface of the optical disc 20B.

As shown in Table 5, the front surface (#5) of the objective lens 10 is divided into an inner area and an outer area. The inner area is formed within h (height from the optical axis)≦1.34 mm, and the outer area is formed within h>1.34.

Each of the front (#5) and rear (#6) surfaces of the objective lens 10 according to the second example is an aspherical surface expressed by the above mentioned equation of X(h). Table 7 shows the conical coefficient and aspherical coefficients of the front and rear surfaces (#5 and #6) of the objective lens 10.

TABLE 7

|  | K | A4 | A6 |
|---|---|---|---|
| #5 (h ≦ 1.34) | −0.4700 | −1.3530E−02 | −1.1600E−03 |
| #5 (h > 1.34) | −0.4700 | −1.4480E−02 | −5.9600E−04 |
| #6 | 0.0000 | 5.1500E−02 | −1.7120E−02 |

|  | A8 | A10 | A12 |
|---|---|---|---|
| #5 (h ≦ 1.34) | −2.5230E−04 | −1.4940E−04 | 7.5050E−06 |
| #5 (h > 1.34) | −8.5900E−05 | −1.8530E−04 | 1.3200E−05 |
| #6 | 4.2900E−03 | −6.1800E−04 | 4.5200E−05 |

On the front surface (#5) of the objective lens 10, a diffracting structure is formed. The diffracting structure is expressed by an optical path difference function Φ(h):

$$\Phi(h) = (P_2 h^2 + P_4 h^4 + P_6 h^6 + \ldots) \times m \times \lambda$$

where $P_2$, $P_4$ and $P_6$ are coefficients of second, fourth and sixth orders, h represents a height from the optical axis, m represents a diffraction order, and λ represents a working wavelength. The optical path difference Φ(h) indicates a difference of an optical path length of a hypothetical ray of light which does not pass through the diffractive lens structure and an optical path length of a ray of light which is diffracted by the diffraction lens structure, at the height h from the optical axis. In other words, the optical path difference Φ(h) represents the additional optical path length of each ray of light which is diffracted by the diffractive lens structure. "m" represents the diffraction order. In this example, m is 1, i.e., the first order diffracted light is used.

Table 8 shows values of the coefficients of the optical path difference function Φ(h) applied to the diffracting structure formed on the front surface (#5) of the objective lens 10.

TABLE 8

| surface | P2 | P4 | P6 | P8 |
|---|---|---|---|---|
| #5 (h ≦ 1.34) | 1.5000E+00 | −5.5000E+00 | −1.0000E−01 | −2.5000E−02 |
| #5 (h > 1.34) | 1.5000E+00 | −6.3200E+00 | 5.0000E−01 | 0.0000E+00 |

As shown Tables 5 through 8, with regard to the radius of curvature, the aspherical shape and the diffracting structure, the inner area (h≦1.34) and the outer area (h>1.34) of the front surface (#5) of the objective lens 10 have different configurations.

In the above mentioned numerical configuration of the second example, the objective lens 10 has optical performance of $(CM_{D1}/CM_{L1}) = -0.493$ and $(CM_{D2}/CM_{L2}) = -0.961$. The lens actuating mechanism 3 (i.e. the actuator 32) performs the tracking operation and tilting operation for the objective lens 10 (i.e. shifts and tilts the objective lens 10) while keeping a relationship of $d_1 \cdot \tan \theta_1 / TR = 0.5$ when the optical disc 20A is used. The expression $(CM_{D1}/CM_{L1}) \cdot d_1 \cdot \tan \theta_1 / TR$ takes a value of −0.247 in this example. Therefore, the optical system 200 according to the second example satisfies the conditions (6), (7) (8) and (9) in the recording/reproducing operation for the optical disc 20A.

Figure 5:
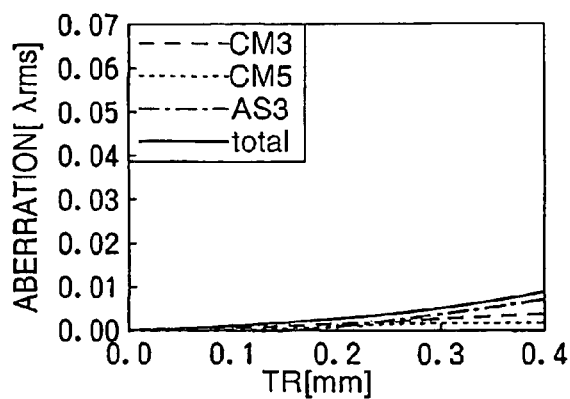
FIG. 5 is a graph illustrating the amounts of asymmetric aberrations caused by tracking shift movement of the objective lens when a first optical disc having relatively thin cover layer is used in a second example.

FIG. 5 is a graph illustrating amounts of asymmetric aberrations caused by the tracking shift movement of the objective lens 10 when the optical disc 20A is used. As shown in FIG. 5, the coma and astigmatism (i.e. the aberrations having asymmetric property) are sufficiently suppressed even if the objective lens 10 is shifted by the tracking operation when the optical disc 20A is used. According to the optical system 200 of the second example, the recording/reproducing operation for the optical disc 20A can be performed with high precision.

Figure 6:
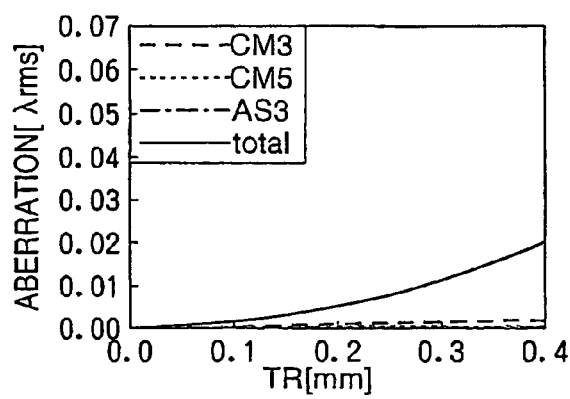
FIG. 6 is a graph illustrating the amounts of asymmetric aberrations caused by the tracking shift movement of the objective lens when a second optical disc having relatively thick cover layer is used in the second example.

In the second example, the tilting operation of the objective lens 10 is not performed when the optical disc 20B is used. Therefore, both of the conditions (4) and (5) are satisfied. FIG. 6 is a graph illustrating the amounts of asymmetric aberrations caused by the tracking shift movement of the objective lens 10 when the optical disc 20B is used. As shown in FIG. 6, the coma and astigmatism are reduced to practically negligible levels even if the objective lens 10 is shifted by the tracking operation when the optical disc 20B is used.

THIRD EXAMPLE

An optical system according to a third example has the same performance specifications and numerical configurations as those of the second example. Therefore, explanations of the detailed configuration of the third example will not be repeated. With regard to the use of the optical disc 20A, the same advantages as those of the second example are attained.

Further, the optical system 200 according to the third example is configured to perform the tilting operation in the same manner as that of the first example when the optical disc 20A is used. The feature of the third example is that the tilting operation is performed when the optical disc 20B is used.

When the optical disc 20B is used, the lens actuating mechanism 3 (i.e. the actuator 32) performs the tilting operation to satisfy $\theta_2/\theta_1 = 0.4$ (i.e. to satisfy the condition (4)).

Figure 7:
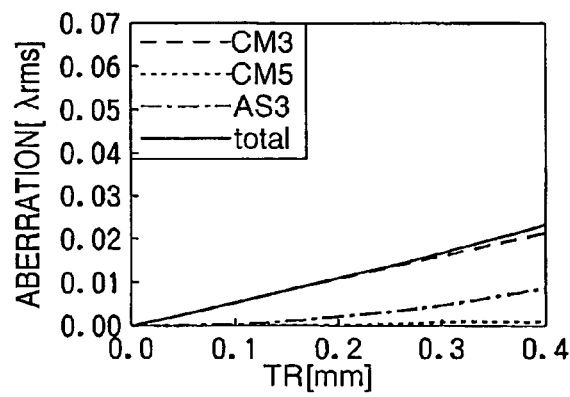
FIG. 7 is a graph illustrating the amounts of asymmetric aberrations caused by the tracking shift movement of the objective lens when the second optical disc is used in a third example.

FIG. 7 is a graph illustrating the amounts of asymmetric aberrations caused by the tracking shift movement of the objective lens 10 when the optical disc 20B is used. As shown in FIG. 7, the coma and astigmatism (i.e. the aberrations having asymmetric property) are reduced to practically negligible levels even if the objective lens 10 is shifted by the tracking operation when the optical disc 20B is used.

FOURTH EXAMPLE

An optical system according to a fourth example has the configuration described in the second embodiment with reference to FIG. 3. Therefore, the fourth example will be explained with reference to FIG. 3. Table 9 shows performance specifications of the optical system 200 according to the fourth example. Table 10 shows a numerical configuration of the optical system 200 of the fourth example when the optical disc 20A is used. Table 11 shows a numerical configuration of the optical system 200 of the fourth example when the optical disc 20B is used. Since the optical system 200 supports the optical discs 20A (e.g., DVD) and 20B (e.g., CD), in this example, the performance specifications and numerical configurations are indicated for each of the optical discs 20A and 20B.

TABLE 9

|  | Optical Disc 20A | Optical Disc 20B |
|---|---|---|
| DESIGN WAVELENGTH λ (nm) | 655 | 790 |
| NA | 0.65 | 0.51 |
| M | −0.1429 | −0.1411 |
| THICKNESS OF COVER LAYER (mm) | 0.60 | 1.20 |

TABLE 10

| Surface Number | r | d | n | ν |
|---|---|---|---|---|
| #0 |  | 0.50 |  |  |
| #1 |  | 0.25 | 1.516 | 64.2 |
| #2 |  | 2.00 |  |  |
| #3 |  | 1.00 | 1.516 | 64.2 |
| #4 |  | 12.43 |  |  |
| #5 (h ≦ 1.36) | 1.590 | 2.00 | 1.544 | 55.7 |
| #5 (h > 1.36) | 1.590 | 2.00 | 1.544 | 55.7 |
| #6 | −2.940 | 1.25 |  |  |
| #7 |  | 0.60 | 1.585 | 29.9 |
| #8 |  | — |  |  |

TABLE 11

| Surface Number | r | d | n | ν |
|---|---|---|---|---|
| #0 |  | 0.50 |  |  |
| #1 |  | 0.25 | 1.516 | 64.2 |
| #2 |  | 2.00 |  |  |
| #3 |  | 1.00 | 1.516 | 64.2 |
| #4 |  | 12.80 |  |  |
| #5 (h ≦ 1.36) | 1.590 | 2.00 | 1.544 | 55.7 |
| #6 | −2.940 | 0.88 |  |  |
| #7 |  | 1.20 | 1.585 | 29.9 |
| #8 |  | — |  |  |

The surface numbers shown in Tables 10 and 11 have the same meanings as those shown in Tables 5 and 6.

Each of the front (#5) and rear (#6) surfaces of the objective lens 10 according to the fourth example is an aspherical surface expressed by the above mentioned equation of X(h). Table 12 shows the conical coefficient and aspherical coefficients of the front and rear surfaces (#5 and #6) of the objective lens 10.

TABLE 12

|  | K | A4 | A6 |
|---|---|---|---|
| #5 (h ≦ 1.36) | −0.4700 | −1.4690E−02 | −1.1780E−03 |
| #5 (h > 1.36) | −0.4700 | −1.5490E−02 | −4.2180E−04 |
| #6 | 0.0000 | 6.7400E−02 | −2.5260E−02 |

|  | A8 | A10 | A12 |
|---|---|---|---|
| #5 (h ≦ 1.36) | −3.8360E−04 | −5.3980E−05 | −1.5840E−05 |
| #5 (h > 1.36) | −2.6000E−04 | −7.9270E−05 | −1.2790E−05 |
| #6 | 7.1970E−03 | −1.2590E−03 | 1.1210E−04 |

On the front surface (#5) of the objective lens 10, a diffracting structure is formed. Table 13 shows values of the coefficients of the optical path difference function Φ(h) applied to the diffracting structure formed on the front surface (#5) of the objective lens 10.

TABLE 13

| surface | P2 | P4 | P6 | P8 |
|---|---|---|---|---|
| #5 (h ≦ 1.36) | 1.0000E+00 | −5.4000E+00 | −1.5500E−01 | 0.0000E+00 |
| #5 (h > 1.36) | 1.0000E+00 | −6.1000E+00 | 5.9000E−01 | 0.0000E+00 |

As shown in Tables 10 through 13, with regard to the radius of curvature, the aspherical shape and the diffracting structure, the inner area (h≦1.36) and the outer area (h>1.36) of the front surface (#5) of the objective lens 10 have different configurations.

In the above mentioned numerical configuration of the fourth example, the objective lens 10 has optical performance of $(CM_{D1}/CM_{L1})=-0.653$ and $(CM_{D2}/CM_{L2})=-1.191$. The lens actuating mechanism 3 (i.e. the actuator 32) performs the tracking operation and tilting operation for the objective lens 10 (i.e. shifts and tilts the objective lens 10) while keeping a relationship of $d_1 \cdot \tan \theta_1 / TR = 0.30$ when the optical disc 20A is used. The expression $(CM_{D1}/CM_{L1}) \cdot d_{1 \cdot \tan \theta_1}/TR$ takes a value of −0.196 in this example. Therefore, the optical system 200 according to the fourth example satisfies the conditions (6), (7) (8) and (9) in the recording/reproducing operation for the optical disc 20A.

Figure 8:
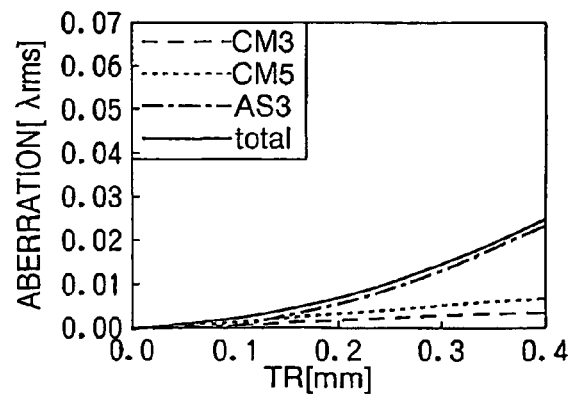
FIG. 8 is a graph illustrating the amounts of asymmetric aberrations caused by the tracking shift movement of the objective lens when the first optical disc is used in a fourth example.

FIG. 8 is a graph illustrating the amounts of asymmetric aberrations caused by the tracking shift movement of the objective lens 10 when the optical disc 20A is used. As shown in FIG. 8, even if the objective lens 10 is shifted by the tracking operation when the optical disc 20A is used, the coma is sufficiently suppressed and also the astigmatism is reduced to a practically negligible level. According to the optical system 200 of the fourth example, the recording/reproducing operation for the optical disc 20A can be performed with high precision.

Figure 9:
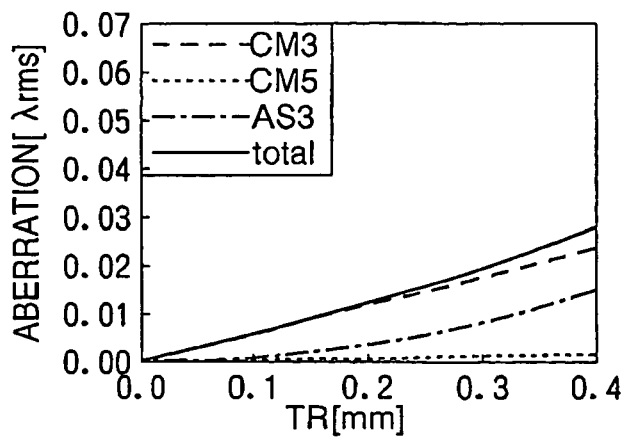
FIG. 9 is a graph illustrating the amounts of asymmetric aberrations caused by the tracking shift movement of the objective lens when the second optical disc is used in the fourth example.

In the fourth example, the tilting operation of the objective lens 10 is not performed when the optical disc 20B is used. Therefore, both of the conditions (4) and (5) are satisfied. FIG. 9 is a graph illustrating the amounts of asymmetric aberrations caused by the tracking shift movement of the objective lens 10 when the optical disc 20B is used. As shown in FIG. 9, the coma and astigmatism (i.e. the aberrations having asymmetric property) are reduced to practically negligible levels even if the objective lens 10 is shifted by the tracking operation when the optical disc 20B is used.

FIFTH EXAMPLE

An optical system according to a fifth example has the same performance specifications and numerical configurations as those of the fourth example. Therefore, explanations of the detailed configuration of the fifth example will not be repeated. With regard to the use of the optical disc 20A, the fifth example attains the same advantages as those of the fourth example.

Further, the optical system 200 according to the fifth example is configured to perform the tilting operation in the same manner as that of the first example when the optical disc 20A is used. The feature of the fifth example is that the tracking amount and the tilting amount for the tracking and tilting operation are different from those of the fourth example.

Specifically, the lens actuating mechanism 3 (i.e. the actuator 32) performs the tracking operation and tilting operation for the objective lens 10 (i.e. shifts and tilts the objective lens 10) while keeping a relationship of $d_1 \cdot \tan \theta_1 / TR = 0.45$. The expression $(CM_{D1}/CM_{L1}) \cdot d_1 \cdot \tan \theta_1 / TR$ takes a value of −0.294 in this example. Therefore, although the tracking amount and the tilting amount are different from those of the fourth example, the conditions (6), (7) and (8) in the recording/reproducing operation for the optical disc 20A are satisfied.

Figure 10:
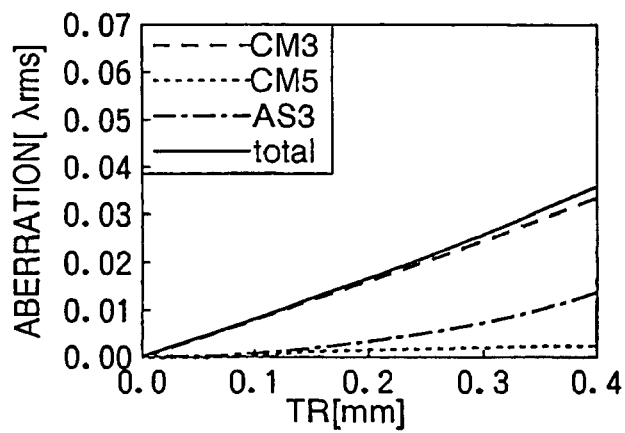
FIG. 10 is a graph illustrating the amounts of asymmetric aberrations caused by the tracking shift movement of the objective lens when the first optical disc is used in a fifth example.

FIG. 10 is a graph illustrating the amounts of asymmetric aberrations caused by the tracking shift movement of the objective lens 10 when the optical disc 20A is used. As shown in FIG. 10, the astigmatism is extremely suppressed, although the coma has a slightly larger amount than the astigmatism. Therefore, the optical system 200 according to the fifth example has an advantage in its suitability for an optical system for an optical disc drive having a (optical) signal property having relatively high sensitivity to astigmatism.

SIXTH EXAMPLE

An optical system according to a sixth example has the configuration described in the second embodiment with reference to FIG. 3. Therefore, the sixth example will be explained with reference to FIG. 3. Table 14 shows performance specifications of the optical system 200 according to the sixth example. Table 15 shows a numerical configuration of the optical system 200 of the sixth example when the optical disc 20A is used. Table 16 shows a numerical configuration of the optical system 200 of the sixth example when the optical disc 20B is used. Since the optical system 200 supports the optical discs 20A (e.g., DVD) and 20B (e.g., CD), in this example, the performance specifications and numerical configurations are indicated for each of the optical discs 20A and 20B.

TABLE 14

|  | Optical Disc 20A | Optical Disc 20B |
|---|---|---|
| DESIGN WAVELENGTH λ (nm) | 655 | 790 |
| NA | 0.65 | 0.51 |
| M | −0.1429 | −0.1411 |
| THICKNESS OF COVER LAYER (mm) | 0.60 | 1.20 |

TABLE 15

| Surface Number | r | d | n | ν |
|---|---|---|---|---|
| #0 |  | 0.50 |  |  |
| #1 |  | 0.25 | 1.516 | 64.2 |
| #2 |  | 2.00 |  |  |
| #3 |  | 1.00 | 1.516 | 64.2 |
| #4 |  | 16.16 |  |  |
| #5 (h ≦ 1.48) | 1.764 | 2.00 | 1.544 | 55.7 |
| #5 (h > 1.48) | 1.764 | 2.00 | 1.544 | 55.7 |
| #6 | −3.440 | 1.49 |  |  |
| #7 |  | 0.60 | 1.585 | 29.9 |
| #8 |  | — |  |  |

TABLE 16

| Surface Number | r | d | n | ν |
|---|---|---|---|---|
| #0 |  | 0.50 |  |  |
| #1 |  | 0.25 | 1.516 | 64.2 |
| #2 |  | 2.00 |  |  |
| #3 |  | 1.00 | 1.516 | 64.2 |
| #4 |  | 16.53 |  |  |
| #5 (h ≦ 1.48) | 1.764 | 2.00 | 1.544 | 55.7 |
| #6 | −3.440 | 1.12 |  |  |
| #7 |  | 1.20 | 1.585 | 29.9 |
| #8 |  | — |  |  |

The surface numbers shown in Tables 15 and 16 have the same meanings as those shown in Tables 5 and 6.

Each of the front (#5) and rear (#6) surfaces of the objective lens 10 according to the sixth example is an aspherical surface expressed by the above mentioned equation of X(h). Table 17 shows the conical coefficient and aspherical coefficients of the front and rear surfaces (#5 and #6) of the objective lens 10.

TABLE 17

|  | K | A4 | A6 |
|---|---|---|---|
| #5 (h ≦ 1.48) | −0.4700 | −1.0160E−02 | −7.6760E−04 |
| #5 (h > 1.48) | −0.4700 | −1.0010E−02 | −5.1290E−04 |
| #6 | 0.0000 | 4.4280E−02 | −1.3560E−02 |

|  | A8 | A10 | A12 |
|---|---|---|---|
| #5 (h ≦ 1.48) | −1.5300E−04 | −5.3300E−05 | 5.9470E−07 |
| #5 (h > 1.48) | −9.8500E−05 | −6.4860E−05 | 1.7760E−06 |
| #6 | 3.1350E−03 | −4.3270E−04 | 2.9490E−05 |

On the front surface (#5) of the objective lens 10, a diffracting structure Is formed. Table 18 shows values of the coefficients of the optical path difference function $\Phi(h)$ applied to the diffracting structure formed on the front surface (#5) of the objective lens 10.

TABLE 18

| surface | P2 | P4 | P6 | P8 |
|---|---|---|---|---|
| #5 (h ≦ 1.48) | 1.0000E+00 | −3.7630E+00 | −7.3000E−02 | 0.0000E+00 |
| #5 (h > 1.48) | 1.0000E+00 | −3.6650E+00 | 1.8400E−01 | 0.0000E+00 |

As shown in Tables 15 through 18, with regard to the radius of curvature, the aspherical shape and the diffracting structure, the inner area (h≦1.48) and the outer area (h>1.48) of the front surface (#5) of the objective lens have different configurations.

In the above mentioned numerical configuration of the sixth example, the objective lens 10 has optical performance of $(CM_{D1}/CM_{L1})=-0.442$ and $(CM_{D2}/CM_{L2})=-0.918$. The lens actuating mechanism 3 (i.e. the actuator 32) performs the tracking operation and tilting operation for the objective lens 10 (i.e. shifts and tilts the objective lens 10) while keeping a relationship of $d_1 \cdot \tan \theta_1 / TR = 0.55$ when the optical disc 20A is used. The expression $(CM_{D1}/CM_{L1}) \cdot d_1 \cdot \tan \theta_1 / TR$ takes a value of −0.243 in this example. Therefore, the optical system 200 according to the sixth example satisfies the conditions (6), (7) (8) and (9) in the recording/reproducing operation for the optical disc 20A.

Figure 11:
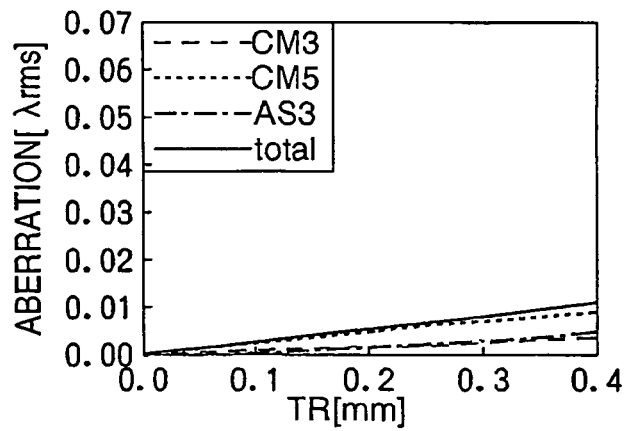
FIG. 11 is a graph illustrating the amounts of asymmetric aberrations caused by the tracking shift movement of the objective lens when the first optical disc is used in a sixth example.

FIG. 11 is a graph illustrating amounts of asymmetric aberrations caused by the tracking shift movement of the objective lens 10 when the optical disc 20A is used. As shown in FIG. 11, the coma and astigmatism are sufficiently suppressed even if the objective lens 10 is shifted by the tracking operation when the optical disc 20A is used. According to the optical system 200 of the sixth example, the recording/reproducing operation for the optical disc 20A can be performed with high precision.

When the optical disc 20B is used, the lens actuating mechanism 3 (i.e. the actuator 32) performs the tilting operation to satisfy $\theta_2/\theta_1=0.2$ (i.e. to satisfy the condition (4)).

Figure 12:
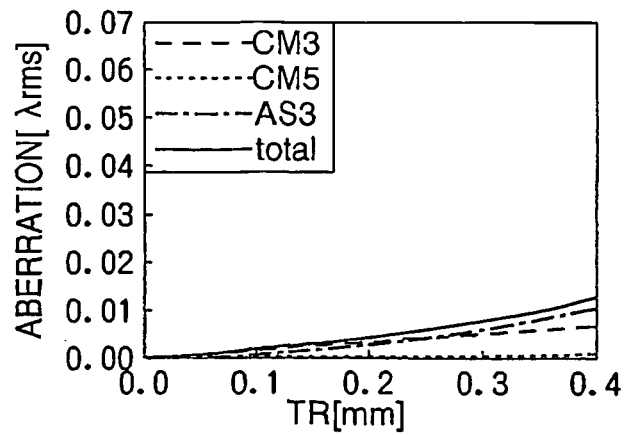
FIG. 12 is a graph illustrating the amounts of asymmetric aberrations caused by the tracking shift movement of the objective lens when the second optical disc is used in the sixth example.

FIG. 12 is a graph illustrating amounts of asymmetric aberrations caused by the tracking shift movement of the objective lens 10 when the optical disc 20B is used. As shown in FIG. 12, the coma and astigmatism (i.e. the aberrations having asymmetric property) are reduced to practically negligible levels even if the objective lens 10 is shifted by the tracking operation when the optical disc 20B is used.

Although the present invention has been described in considerable detail with reference to certain preferred embodiments thereof, other embodiments are possible.

Figure 13:
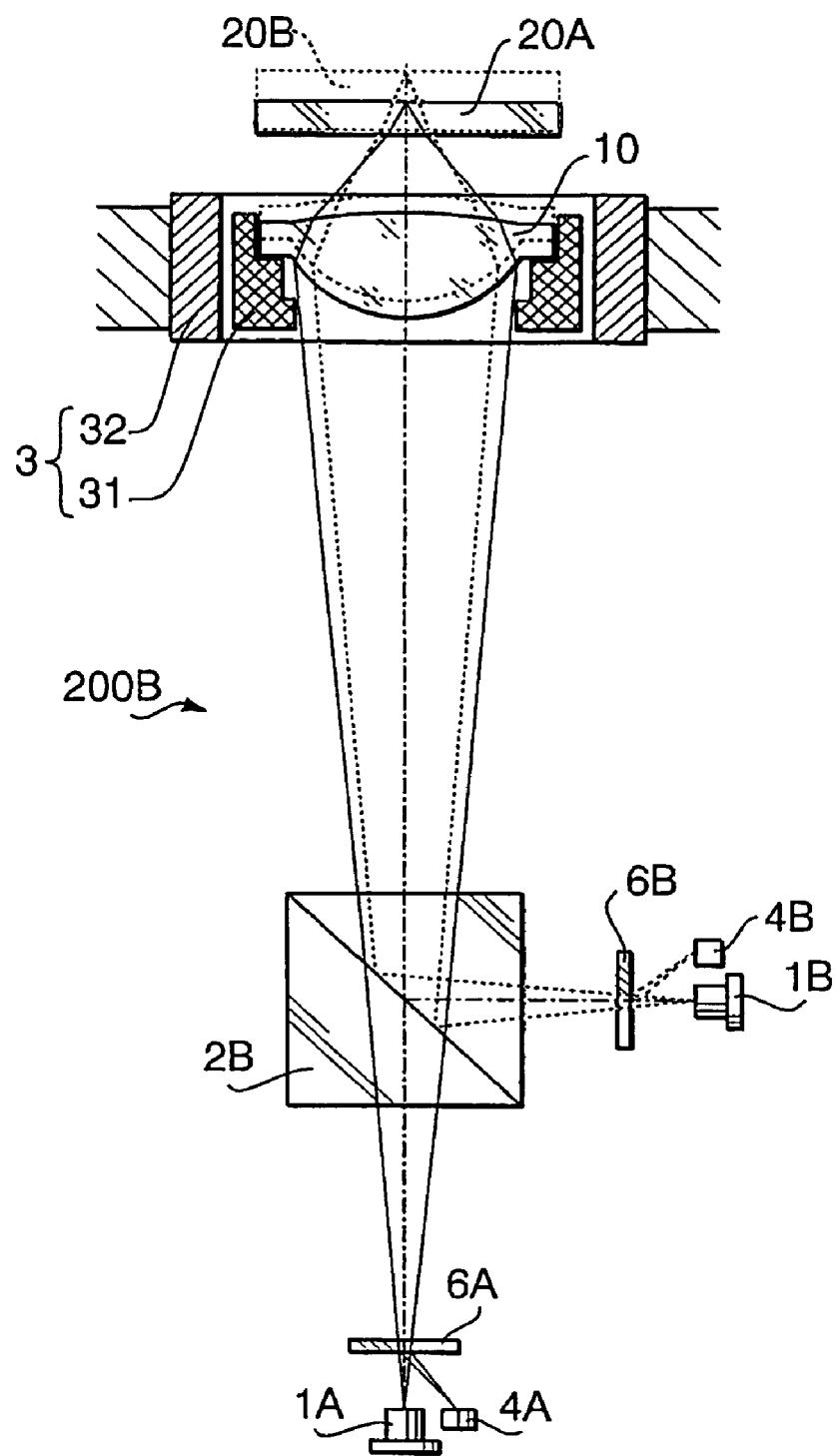
FIG. 13 schematically shows an optical system as a variation of the optical system according to the second embodiment.

FIG. 13 schematically shows an optical system 200B as a variation of the optical system 200 according to the second embodiment. That is, the optical system 200B is used for recording data to and/or reproducing data from the plurality of types of the optical discs. In FIG. 13, to elements which are similar to those shown in FIG. 3, the same reference numbers are assigned, and the detailed description thereof will not be repeated.

As shown in FIG. 13, the optical system 200B has separate light sources 1A and 1B. The light source 1A emits a laser beam having a wavelength for the optical disc 20A, and the light source 1B emits a laser beam having a wavelength for the optical disc 20B. As shown in FIG. 13, the laser beam emitted by the light source 1A passes through a diffraction grating 6A and a beam splitter 2B, and then is converged by the objective lens 10 onto the data recording surface of the optical disc 20A.

The laser beam emitted by the light source 1B passes through a diffraction grating 6B, and is reflected by the beam splitter 2B to be incident on the objective lens 10. Then, the laser beam reflected from the beam splitter 2B is converged by the objective lens 10 onto the recording surface of the optical disc 20B. Optical signals (retuning light beams) from the optical discs 20A and 20B are incident on sensors 4A and 4B through the diffraction gratings 6A and 6B, respectively. Similarly to the second embodiment, the tilting operation for the objective lens 10 is performed during the tracking shift movement of the objective lens when the recording/reproducing operation is performed for the optical disc having the thinnest cover layer (i.e. the optical disc 20A). Therefore, the recording/reproducing operation can be performed with high precision.

The present disclosure relates to the subject matter contained in Japanese Patent Application No. P2003-420819, filed on Dec. 18, 2003, which is expressly incorporated herein by reference in its entirety.

What is claimed is:

1. A finite optical system for recording data to and/or reproducing data from an optical disc having a numerical aperture on an optical disc side larger than or equal to 0.60, comprising:

a light source that emits a diverging light beam;
an objective lens that converges the diverging light beam onto a data recording surface of the optical disc; and
a driving system that controls a position and an attitude of the objective lens,
wherein the driving system operates to move the objective lens in a direction perpendicular to a central axis of the objective lens for a tracking operation, and to change the attitude of the objective lens during the tracking operation so that the central axis on a light source side tilts toward the light source, and
wherein the driving system controls the position and the attitude of the objective lens to satisfy a condition:

$$0.25 \leq d \cdot \tan \theta / TR \leq 0.75 \quad (1)$$

where d (mm) represents a distance on an air basis between the light source and the data recording surface of the optical disc, TR (mm) represents a shifting amount of an object image caused by tracking shift movement of the objective lens by the tracking operation, and $\theta$ (°) represents a tilting amount of the objective lens with respect to a reference axis of the optical system.

2. The optical system according to claim 1, wherein the objective lens is configured to satisfy a condition:

$$-0.75 \leq CM_D/CM_L \leq -0.15 \quad (2)$$

where $CM_L$ represents sensitivity of a coma caused when only the objective lens tilts with respect to the light beam from the light source, and $CM_D$ represents sensitivity of a coma caused when only the optical disc tilts with respect to the light beam passed through the objective lens.

3. The optical system according to claim 1, wherein the optical system satisfies a condition:

$$-0.30 \leq (CM_D/CM_L) \cdot d \cdot \tan \theta / TR \leq -0.15 \quad (3)$$

where $CM_L$ represents sensitivity of a coma caused when only the objective lens tilts with respect to the light beam from the light source, and $CM_D$ represents sensitivity of a coma caused when only the optical disc tilts with respect to the light beam passed through the objective lens.

4. A finite optical system for recording data to and/or reproducing data from a plurality of types of optical discs, comprising:

a plurality of light sources that emit diverging light beams respectively corresponding to the plurality of types of optical discs;
an objective lens that converges each of the diverging light beams onto a data recording surface of corresponding one of the plurality of types of optical discs; and
a driving system that controls a position and an attitude of the objective lens,
wherein the driving system operates to move the objective lens in a direction perpendicular to a central axis of the objective lens for a tracking operation, and to change the attitude of the objective lens during the tracking operation so that the central axis on a light source side tilts toward a corresponding one of the plurality of light sources at least when a first optical disc having a thinnest cover layer of the plurality of types of optical discs is used, and
wherein when the first optical disc is used, the driving system controls the position and the attitude of the objective lens to satisfy a condition:

$$0.25 \leq d_1 \cdot \tan \theta_1 / TR \leq 0.75 \quad (6)$$

where $d_1$ (mm) represents a distance on an air basis between a first light source of the plurality of the light sources used for the first optical disc and a data recording surface of the first optical disc, TR (mm) represents a shifting amount of an object image caused by tracking shift movement of the objective lens by the tracking operation, and $\theta_1$ (°) represents a tilting amount of the objective lens with respect to a reference axis of the optical system when the first optical disc is used.

5. The optical system according to claim 4,
wherein the driving system changes the attitude of the objective lens to satisfy a condition:

$$-0.1 \leq \theta_2/\theta_1 \leq 1 \quad (4)$$

where $\theta_2$ (°) represents a tilting amount of the objective lens during tracking shift movement of the objective lens by the tracking operation when a second optical disc of the plurality of types of optical discs having a cover layer thicker than that of the first optical disc is used.

6. The optical system according to claim 5,
wherein the driving system changes the attitude of the objective lens to satisfy a condition:

$$\theta_2/\theta_1 = 0 \quad (5).$$

7. The optical system according to claim 4, wherein the first optical disc requires a numerical aperture on an optical disc side larger than or equal to 0.60.

8. The optical system according to claim 5, wherein the second optical disc has a thickest cover layer of all of the plurality of types of optical discs.

9. The optical system according to claim 4,
wherein the objective lens is configured to satisfy a condition:

$$-0.75 \leq CM_{D1}/CM_{L1} \leq -0.15 \quad (7)$$

where $CM_{L1}$ represents sensitivity of a coma caused when only the objective lens tilts with respect to a first light beam emitted by one of the plurality of light sources for the first optical disc, and $CM_{D1}$ represents sensitivity of a coma caused when only the first optical disc tilts with respect to the first light beam passed through the objective lens.

10. The optical system according to claim 4,
wherein the optical system satisfies a condition:

$$-0.30 \leq (CM_{D1}/CM_{L1}) \cdot d_1 \cdot \tan\theta_1 / TR \leq -0.15 \quad (8)$$

where $CM_{L1}$ represents sensitivity of a coma caused when only the objective lens tilts with respect to a first light beam emitted by the first light source, and $CM_{D1}$ represents sensitivity of a coma caused when only the first optical disc tilts with respect to the first light beam passed through the objective lens.

11. The optical system according to claim 4,
wherein the objective lens is configured to satisfy a condition:

$$-1.50 \leq CM_{D2}/CM_{L2} \leq -0.50 \quad (9)$$

where $CM_{L2}$ represents sensitivity of a coma caused when only the objective lens tilts with respect to a second light beam emitted by one of the plurality of light sources used for a second optical disc of the plurality of types of optical discs having a cover layer thicker than that of the first optical disc, and $CM_{D2}$ represents sensitivity of a coma caused when only the second optical disc tilts with respect to the second light beam passed through the objective lens.

12. The optical system according to claim 4,
wherein the plurality of light sources are located at positions shifted with respect to each other in a plane perpendicular to an emitting direction of each of the diverging light beams, and
wherein the plurality of light sources are aligned in a direction perpendicular to a direction in which an object image formed by the objective lens shifts in accordance with tracking shift movement of the objective lens by the tracking operation.

13. The optical system according to claim 4, further comprising a detecting system that detects a type of an optical disc being used,
wherein the driving system sets a changing amount of the attitude of the objective lens responsive to tracking shift movement of the objective lens by the tracking operation and a detection result of the detecting system.

14. The optical system according to claim 4,
wherein the plurality of light sources are located at positions shifted with respect to each other in a plane perpendicular to an emitting direction of each of the diverging light beams, and
wherein the driving system moves the objective lens in the tracking operation with respect to a reference position which is defined for each of the plurality of light sources, the reference position being defined as a position at which the central axis of the objective lens passes through one of the plurality of light sources corresponding to a type of an optical disc being used.

15. The optical system according to claim 14,
wherein the plurality of light sources are aligned in a direction in which an object image formed by the objective lens shifts in accordance with tracking shift movement of the objective lens by the tracking operation.

16. The optical system according to claim 14, further comprising a detecting system that detects the type of the optical disc being used,
wherein the driving system sets a changing amount of the attitude of the objective lens responsive to tracking shift movement of the objective lens by the tracking operation and a detection result of the detecting system, and determines the reference position for the optical disc being used based on the detection result of the detecting system.

17. A finite optical system for recording data to and/or reproducing data from two types of optical discs including a first optical disc and a second optical disc whose cover layer is approximately twice as thick as that of the first optical disc, comprising:
a plurality of light sources that emit diverging light beams respectively corresponding to the first and second optical discs;
an objective lens that converges each of the diverging light beams onto a data recording surface of corresponding one of the first and second optical discs; and
a driving system that controls a position and an attitude of the objective lens, wherein the objective lens has sensitivity of a coma caused by a cover layer of the second optical disc,
wherein the driving system operates to move the objective lens in a direction perpendicular to a central axis of the objective lens for a tracking operation,
wherein when the first optical disc is used, the driving system operates to change the attitude of the objective lens during the tracking operation so that the central axis on a light source side tilts toward one of the light sources used for the first optical disc by an amount which is approximately half of a tilting amount by which astigmatism caused by tracking shift movement of the objective lens by the tracking operation is substantially completely corrected, wherein when the second optical disc is used, the driving system operates not to change the attitude of the objective lens during the tracking operation, and wherein when the first optical disc is used, the driving system controls the position and the attitude of the objective lens to satisfy a condition:

$$0.25 \leq d \cdot \tan\theta / TR \leq 0.75 \tag{1}$$

where d (mm) represents a distance on an air basis between the one of the light sources used for the first optical disc and the data recording surface of the first optical disc, TR (mm) represents a shifting amount of an object image caused by tracking shift movement of the objective lens by the tracking operation, and θ (°) represents a tilting amount of the objective lens with respect to a reference axis of the optical system when the first optical disc is used.

18. The optical system according to claim 17,
wherein the objective lens is configured to satisfy a condition:

$$-0.75 \leq CM_D / CM_L \leq -0.15 \tag{2}$$

where $CM_L$ represents sensitivity of a coma caused when only the objective lens tilts with respect to a first light beam from the one of the light sources for the first optical disc, and $CM_D$ represents sensitivity of a coma caused when only the first optical disc tilts with respect to the first light beam passed through the objective lens.

* * * * *